United States Patent [19]

Greene

[11] 4,424,538
[45] Jan. 3, 1984

[54] TAPE RECORDER WITH DIGITAL AUTOMATIC LEVEL CONTROL

[75] Inventor: Ronald K. Greene, North Las Vegas, Nev.

[73] Assignee: 50 States Distributing Company, Las Vegas, Nev.

[21] Appl. No.: 346,568

[22] Filed: Feb. 8, 1982

[51] Int. Cl.³ ............................................... G11B 5/02
[52] U.S. Cl. ...................................................... 360/68
[58] Field of Search ........................ 360/68, 67, 25, 31

[56] References Cited

U.S. PATENT DOCUMENTS 4,274,117 6/1981 Tomita .................................. 360/68

Primary Examiner—Vincent P. Canney
Attorney, Agent, or Firm—Seiler & Quirk

[57] ABSTRACT

An audio tape recorder having particular utility for retrofitting vehicles having radios, tape players, or other audio generating devices has an automatic signal level control circuit adaptable to very wide ranges of input circuit level. The circuit has a variable resistor in parallel with the audio output having a resistance level dependent on the voltage output of a digital voltage counter. The voltage counter sets out a discrete stepped output dependent on signals generated from a peak detector, which detects input signal peaks above a preset level, and a low level detector, which detects average input signal levels below a predetermined level. A delay switch prevents the low level detector from actuating the counter for a preset period.

8 Claims, 3 Drawing Figures

TAPE RECORDER WITH DIGITAL AUTOMATIC LEVEL CONTROL

BACKGROUND OF THE INVENTION

This invention relates to a recording device, and particularly to a tape recorder for attachment to an existing audio system. The apparatus of the invention is especially useful for retrofitting to an existing audio system (e.g., tape playback and/or radio) in vehicles.

People are spending increasing amounts of time in recent years in vehicles. In addition to increased road travel in automobiles and trucks, the popularity of recreational vehicles has afforded the opportunity to take extended trips while maintaining the comforts of home right at hand. Indeed, it is not uncommon for people to live in recreational vehicles for weeks or even months at a time.

A vast majority of all vehicles are equipped with a radio receiver for entertainment of passengers during travel. In more recent years, it has become common for vehicles also to carry an audio tape playback unit, which plays prerecorded tapes (usually cassette or eight-track) through speakers installed for the radio. Combination radio/tape playback units are also available for installation in vehicles, and have in fact been installed in millions of vehicles still on the road.

In some cases, it would also be desirable to have the capability to record tapes from the vehicular sound system. It is of course common for people to record tapes of radio and television broadcasts in their homes with equipment sold for that purpose. This equipment may be quite sophisticated and is often physically bulky, although in a home, size is generally not an important criterion for suitability. It would be useful, however, to have available a small stereo recording unit for use in a vehicle which could record alternatively from a microphone (e.g., for dictation) or from the existing vehicular sound system. Such a system would preferably receive its input signal from an electrical output from the vehicular system rather than recording the audible output, thus eliminating road noise and other stray noises in the vehicle interior. To be practical, the recorder should also be easily installed, and compact in size.

The ease of connection of a retrofitted tape recorder poses a certain problem in a vehicle. Standard car radios do not provide an externally accessible output signal source other than wires to the speakers. Tape recorder input, however, should be maintained at a signal level independent of the speaker input level. By connecting the recorder to the accessible speaker output of the vehicle radio, the recorder is subjected to a very wide variety of signal levels. Audio magnetic tape recording heads, however, can only faithfully record a relatively restricted range of signal levels. If the signal is too low, the recording will be muted and contain excessive tape hiss. If the signal level is too high, the recording will be broken and distorted. On conventional units, the user can manually set the recording level to an optimum level, with guidance from a meter or signal light. In a vehicle, such a system would pose a potential hazard of removing the driver's attention from the road. Accordingly, it is necessary to have a system which will automatically set the record level, and must be capable of accomodating a wide range of signals without introducing noticeable distortion of the audio signal.

Accordingly, it is an object of the invention to provide an audio magnetic tape recorder for connection to an existing audio system in a vehicle for recording signals produced by said system. It is another object of the invention to provide a tape recorder which is easily electrically connected to the existing audio system and which receives its input signal from the speaker output signal of the system. It is a still further object of the invention to provide a digital automatic level control which operates in the audio frequency range, and which accepts a wide range of input signal levels and maintains a narrow range of output signal levels. These and other objects of the invention are met by the system of the invention, a preferred embodiment of which is described herein.

SUMMARY OF THE INVENTION

Automatic level control circuitry for controlling the level of a signal having substantial potential variation to predetermined high and low levels, said circuitry having input and output means, and variable resistance means in parallel circuitry to the output means. The variable resistance means is controlled by a voltage counter having a series of discrete incremental levels determined by peak signal detecting means for detecting input signal peak levels above a predetermined level, and low level detecting means for determining low average input signal levels. The circuit also comprises a delay switch for preventing the low level detecting means from actuating the voltage counter until a predetermined length of time has expired after the low input signal level has been determined.

BRIEF DESCRIPTION OF THE DRAWINGS

The invention is best understood with reference to the drawings, in which.

DETAILED DESCRIPTION OF A PREFERRED EMBODIMENT

In most home recording systems, the automatic gain control adjusts continuously to keep the signal within certain predetermined levels. In the system of the invention, the recording level is set to one of sixteen preset discrete levels. The setting of the volume control on the vehicular audio system determines the particular level setting. If the input level subsequently becomes lower than a predetermined limit, this condition is detected and a delay switch activated. If the condition persists for a preset period of time (e.g., 20 seconds), the recording level is moved one discrete level to compensate for the change. If, during the delay period, the system input returns to normal, operation of the delay switch is interrupted and no level change is effected. This type of system is particularly advantageous for recording classical music, where extended passages of very soft music may be followed by great crescendos; in this case, no adjustment level is appropriate, nor would it be made by the system of the invention. If, on the other hand, the input level becomes higher than a predetermined limit, this condition is detected and the recording level is moved one level to compensate.

Figure 1:
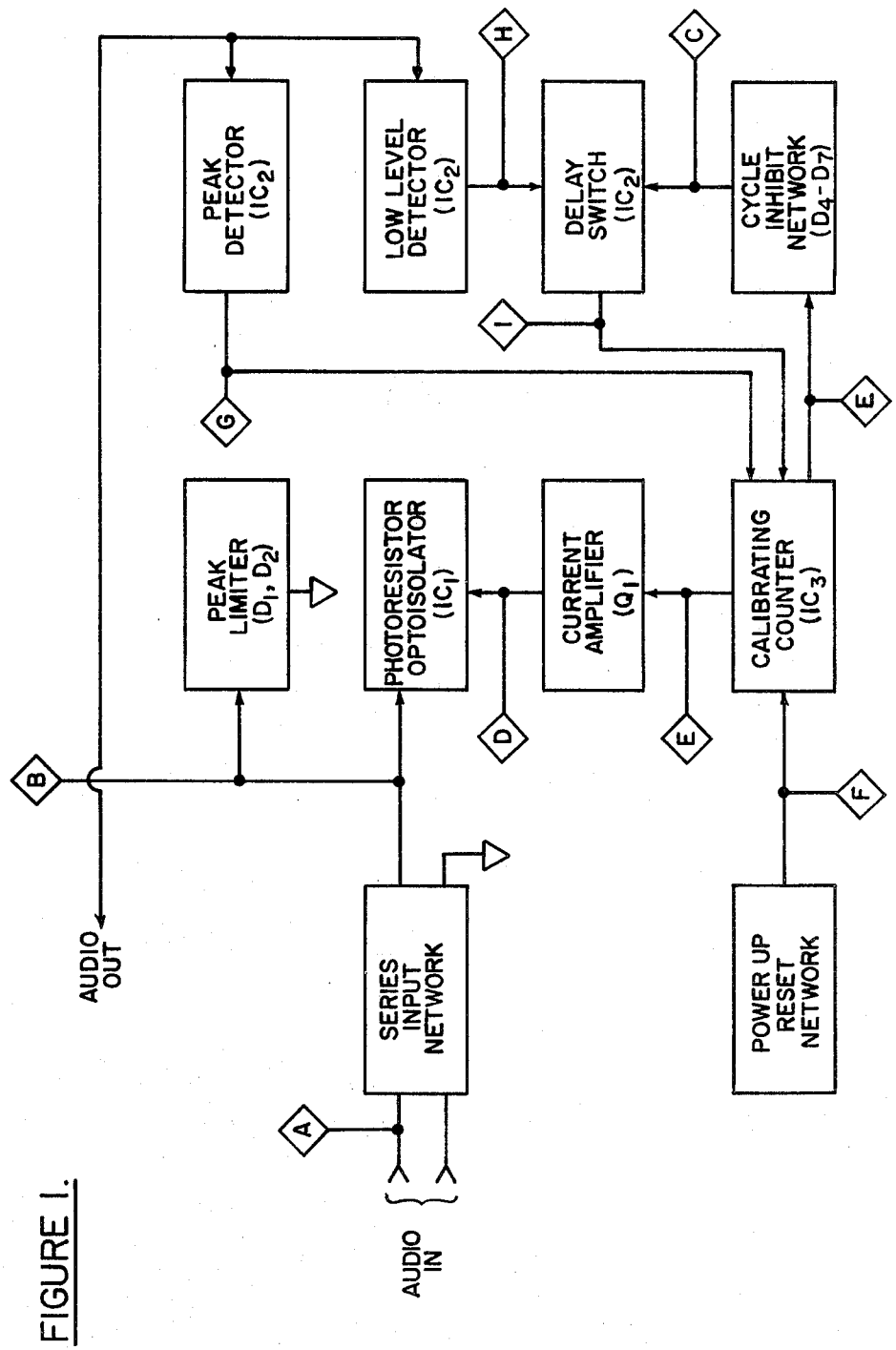
FIG. 1 is a block diagram showing the various functional sections of the automatic level control subsystem.

Referring to FIG. 1, the system has only two sets of external connections. These consist of the "audio input"

connections to the vehicular speaker leads. The complete audio attenuating circuit is formed by the series input network and the photoresistor optoisolator $IC_1$. The series input network equalizes the frequency response of the incoming audio for recording and serves as the series attenuating element for the incoming audio signal. The photoresistor optoisolator $IC_1$ is controlled by the current amplifier and the calibrating counter $IC_3$, a four-bit binary up/down counter which selects the appropriate attenuation level from the 16 preset levels. The counter moves upwardly or downwardly according to signals appearing at CU or CD from the peak detector and low-level detector circuits, respectively, the latter of which operates through delay circuitry to ensure that the low level indicates an actual change of condition rather than a purposeful low level transmission. The net result is a series of stepped currents out of the calibrating counter circuit to the current amplifier.

Figure 2:
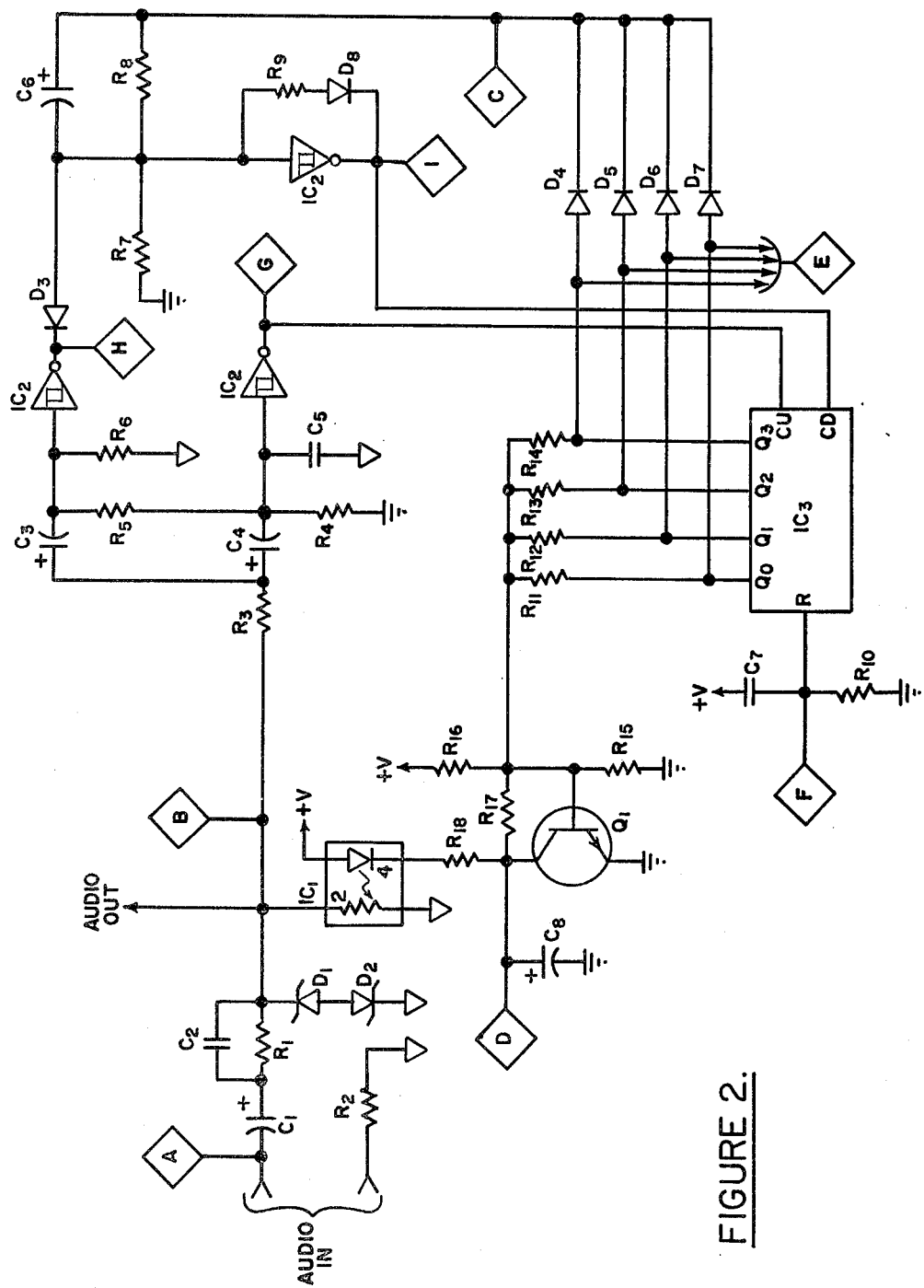
FIG. 2 is a schematic diagram of the entire sybsystem.

The system is best understood in detail with simultaneous reference to FIGS. 1 and 2. The series input network consists of $C_1$, $C_2$, $R_1$, and $R_2$; this subsystem conditions the frequency response and level of the audio signal, attenuating low frequencies and accentuating high frequencies. This system also provides electrical isolation of the audio input from the remainder of the circuit.

The peak limiter ($D_1$, $D_2$) is a conventional circuit for limiting sudden bursts of energy to 4.3 v peak (8.6 v peak-to-peak) to prevent damage to the automatic level control circuitry. Large peaks may occur, for example, if the volume were suddenly turned up, or if lightning caused a burst of static.

The audio level is set by the peak attenuate-low average emphasize rule. That is, the audio music program passing through to the tape heads must be of sufficient amplitude to overcome the background tape hiss, but not so much as to cause head saturation on the music peaks, which results in distortion.

The peak and low average audio levels are detected by $IC_2$, a hex CMOS schmitt trigger inverter. The peak detector circuit consists essentially of $R_3$, $C_4$, $C_5$, $R_4$, $R_5$, $R_6$, $IC_2$, and detects peaks above a preset level (4.5 v). The peak detector, upon detecting a peak above the preset level, sends a negative pulse signal to the calibrating counter which counts up one level, attenuating the audio out. The low level detector circuit, containing $R_3$, $C_3$, $R_4$, $R_5$, $R_6$, and $IC_2$, yields a steady output under normal conditions. If the average level is too low, this circuit stops yielding an output. The delay switch circuit, $D_3$, $C_6$, $R_7$, $R_8$, $D_8$, $R_9$, and $IC_2$, is primarily an oscillator held off by the low level detector, preventing any action at the calibrating counter for about 20 seconds.

$R_3$ effectively isolates the audio out from the networks formed by $C_3$ through $C_5$, and $R_4$ through $R_6$, in order to prevent the distortion which necessarily occurs within these networks from entering the signal path to the recording heads (audio out). $C_3$ and $C_4$ prevent DC coupling between audio out and the inputs to $IC_2$. $R_4$ through $R_6$ form a voltage divider network, which shifts the audio signal to two reference DC voltage levels for triggering $IC_2$. $C_5$ filters out any remaining bias signal from the audio out, and attenuates the high frequency components of the audio, in order to maintain a clean pulse output from $IC_2$ (peak detector). The input to the peak detector, $IC_2$, is normally biased at some DC level which is below the threshold triggering level of the peak detector. Any music peak which exceeds 4.5 volts will trigger the peak detector, causing its output to go low. The output of the peak detector is connected to the count up (CU) input of the calibrating counter, $IC_3$, so that when the music peak falls below the peak detector threshold, and the peak detector output goes high again, the calibrating counter increments, attenuating the audio one step more.

The low level detector ($IC_2$) input is DC biased so that any audio cycle exceeding 2.25 volts peak will cause the output of the low level detector to go low for the duration of that cycle. $D_3$ couples the negative pulses from the low level detector to the RC network formed by $C_6$, $R_7$ and $R_8$. Any negative pulse passed by $D_3$ charges $C_6$ negative, bringing the input of the delay switch, $IC_2$, below its threshold trigger level. $C_6$ discharges through $R_8$ when the low level detector output is high. $R_7$ and $R_8$ form a voltage divider network, which effectively increases the discharge RC time constant of $C_6$ and $R_8$, thus allowing $C_6$ to be of a lower value and subsequently, a smaller size.

Thus, as long as the audio is within the proper amplitude range, the low level detector will continuously trigger, preventing the delay switch, $IC_2$, from switching. There are instances, however, where the audio level drops below the optimum recording level, but emphasis is not desired, as is the case with classical music and jazz particularly, both of which contain loud and soft passages. $C_6$ and $R_8$ then effectively delay the system from responding to normal music amplitude variations.

If the audio amplitude decrease is due to the volume being turned down by the listener, then the music peaks will fall below the triggering level of the low level detector. Its output will remain high, allowing $C_6$ to discharge through $R_8$ to the triggering level of the delay switch, $IC_2$, causing the output of the delay switch, which is connected to the count down (CD) input of the calibrating counter, to go low. This low is coupled through $D_8$ and $R_9$ to $C_6$, which partially charges, causing the output of the delay switch to go high, which decrements the calibrating counter, causing the attenuation level to decrease one step. When $C_6$ discharges past the threshold level again, the delay switch again triggers. This cycle continues until the audio out is brought up to a level which can hold off the delay switch through the low level detector.

The cycle inhibit network, which consists substantially of $D_4$, $D_5$, $D_6$, and $D_7$, prevents the calibrating counter from counting down past 0 count, since the next down count would be 15, maximum attenuation. $D_4$ through $D_7$ couple the high states of $Q_0$ through $Q_3$ of $IC_3$ to $C_6$ and $R_8$, allowing the delay switch to operate normally. At count 0, however, $Q_0$ through $Q_3$ are low, $C_6$ and $R_8$ are held low, preventing the delay switch from triggering, regardless of the output of the low level detector. The delay switch can only be enabled when the peak detector increments the calibrating counter off count 0, and $C_6$ and $R_8$ go high again.

The calibrating counter circuit consists of four-bit binary up/down counter $IC_3$, $R_{11}$, $R_{12}$, $R_{13}$, and $R_{14}$. Clock pulses appearing at terminals CU or CD will cause the counter to count up or down, respectively.

The current amplifier circuit consists of $R_{15}$, $R_{16}$, $R_{17}$, $R_{18}$, $C_8$, and $Q_1$, an NPN switching transistor, and receives its input signal from the calibrating counter. While the ideal attenuation contour from the calibrating counter would be logarithmic, since the human ear can only sense a percentile change from level to level, not a discrete increase or reduction in volume, the attenuation steps set by $R_{11}$ through $R_{14}$, by the nature of the configuration, are linear, not logarithmic. This is partially compensated for by $R_{16}$, which biases $Q_1$ near cutoff, in the non-linear region. The effect is that the first five attenuation steps ($IC_3$ count from 0 to 4) are approximately logarithmic, while the remaining attenuation steps ($IC_3$ count from 5 to 15) are linear. Effectively, this prevents excessive step-to-step attenuation at low signal levels.

The current amplifier supplies current to the photoresistor optoisolator. $R_{18}$ is a current-limiting resistor which limits the power dissipation of $Q_1$. $R_{17}$ is a feedback resistor which sets the DC gain of $Q_1$ to 10. $C_8$ filters any audio signal out of the control current line, and also smoothes the transistion between attenuation levels. $R_{15}$ reduces the effective base resistance of $Q_1$ for stability.

The photoresistor optoisolator ($IC_1$) is a light-controlled resistor that controls volume level. It contains a light-emitting diode (LED) which emits increasing intensity of light with increased current. The resistance of the photoresistor is inversely proportional to the LED light output and consequently, to the LED input current. This circuit forms a voltage divider with $R_1$. As current increases in $IC_1$, resistance in $IC_1$ decreases, resulting in more current through $R_1$ and a lower audio out current.

Finally, the power up reset network $C_7$ and $R_{10}$ form an RC network which holds reset (R) of the calibrating counter high momentarily, causing the calibrating counter to reset to count 0 upon initial power up.

Figure 3:
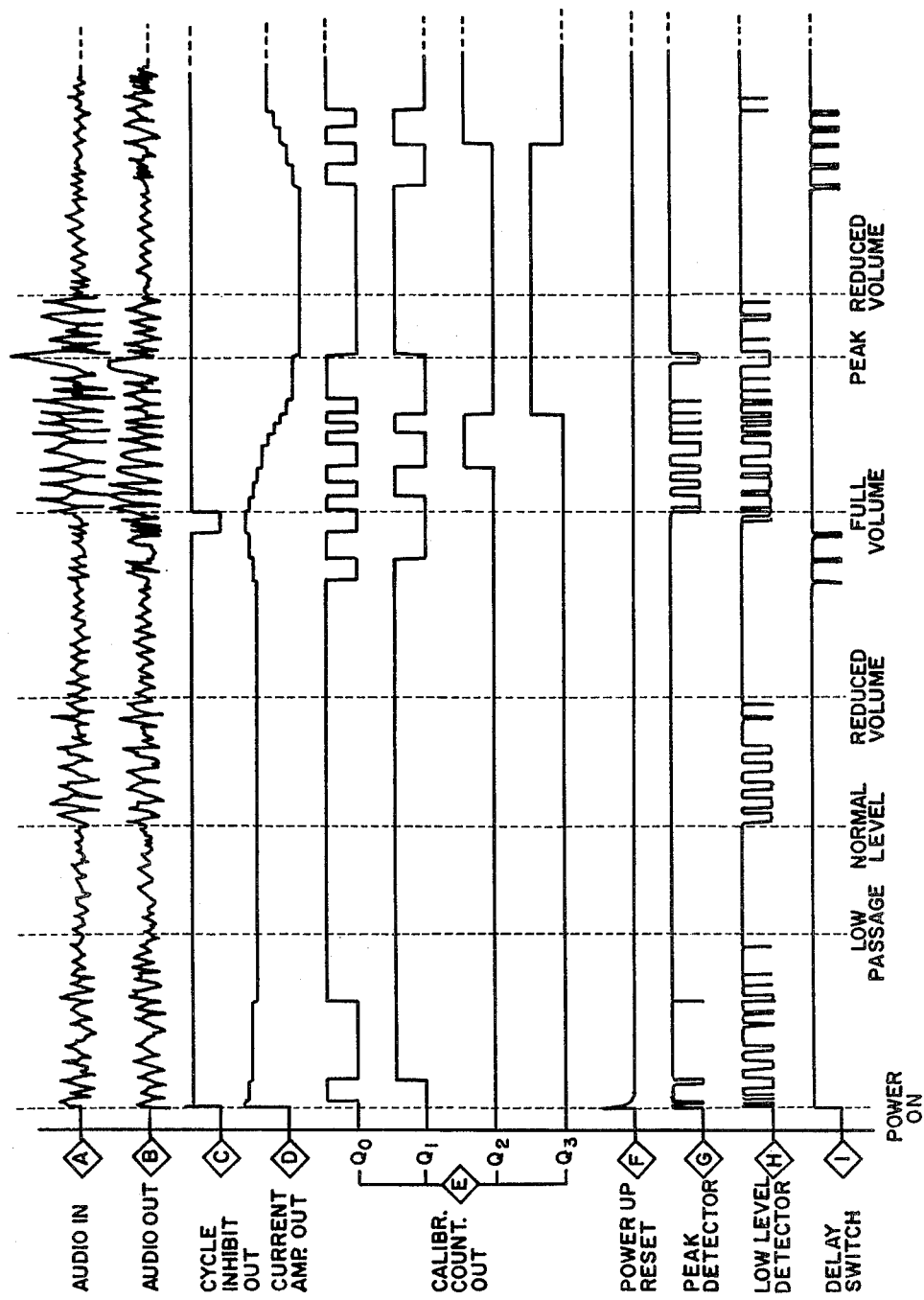
FIG. 3 is a timing diagram showing operation of significant system signals under various conditions.

A timing diagram showing voltage waveforms at various circuit points (denoted by diamond-shaped flags containing capital letters) is shown in FIG. 3. As the power is initially turned on, the power up reset (at "F") gets an initial pulse, and $Q_0$–$Q_3$ are reset to zero (at "E"). As music appears at audio in ("A"), the peak detector ("G") detects peaks above the set point and sets forth a negative pulse ("G"), causing $Q_0$ to count up. A second detected high peak causes $Q_1$ to count up and $Q_0$ to count down, corresponding to a level of "2" on the binary counter. These show as a decrease in voltage (or increase in current) at "D." During this time, the low level detector ("H") pulses continuously since the average level is sufficient. A third high peak results in a third step in the counter ($Q_0$ going high again).

At the first vertical dotted line, a low passage occurs in the music, with output from the low level detector ("H") ceasing, and $C_6$ discharging. At the next vertical dotted line, the music returns to normal level before $C_6$ discharges to the threshold trigger level of the delay switch; accordingly, there is no change in the delay switch ("I"). As the music returns to normal level, the low level detector pulses ("H") and prevents the delay switch from operating.

The next vertical line corresponds to an intentional volume reduction. The low level detector output ceases, after 20 seconds, the delay switch signals and the counter counts down three times ("E" at $Q_0,Q_1$), ending at zero. After the third pulse, the counter is prevented from further countdown by the cycle inhibit network ("C").

The next vertical line corresponds to audio in ("A") being turned up to full volume. Multiple pulses from the peak detector counts the calibrating counter ("E") to nine, stepping the amplifier voltage ("D") downwardly, and attenuating audio out.

The next vertical line corresponds to a peak voltage caused e.g. by lightning. This aberration is limited on audio out ("B") by the peak limiter, and is also detected by the peak detector, causing an upward count.

Finally, a refrain of reduced volume stops the pulses from the low level detector, counting down the delay switch and showing increased audio out ("B"), eventually stabilizing at a count of five.

The following is a parts list for the circuit of the invention:

| | | |
|---|---|---|
| $C_1$ | Electrolytic capacitor | 4.7uF, 25V |
| $C_2$ | Ceramic capacitor | .47uF, 50V |
| $C_3$ | Electrolytic capacitor | 1uF, 50V |
| $C_4$ | Electrolytic capacitor | 1uF, 50V |
| $C_5$ | Ceramic capacitor | .001uF, 50V |
| $C_6$ | Electrolytic capacitor | 22uF, 16V |
| $C_7$ | Electrolytic capacitor | 4.7uF, 25V |
| $C_8$ | Electrolytic capacitor | 1uF, 50V |
| $D_1$ | Zener diode, 3.6V | 1N747A |
| $D_2$ | Zener diode, 3.6V | 1N747A |
| $D_3$ | Signal diode | 1N914 |
| $D_4$ | Signal diode | 1N914 |
| $D_5$ | Signal diode | 1N914 |
| $D_6$ | Signal diode | 1N914 |
| $D_7$ | Signal diode | 1N914 |
| $D_8$ | Signal diode | 1N914 |
| $IC_1$ | Dual photoresistor optoisolator | VTL5C4/2 (Vactec) |
| $IC_2$ | Hex schmitt inverter | 4584 |
| $IC_3$ | Binary up/down counter | 40193 (RCA) |
| $Q_1$ | NPN silicon switching transistor | GES5816 (General Electric) |

The resistors are all ¼ watt power-rated carbon resistors, all having 5% tolerance, with the following resistances:

| Resistor | Ohms |
|---|---|
| $R_1$ | 2.2K |
| $R_2$ | 470 |
| $R_3$ | 100K |
| $R_4$ | 680K |
| $R_5$ | 300K |
| $R_6$ | 360K |
| $R_7$ | 2.2M |
| $R_8$ | 1M |
| $R_9$ | 68K |
| $R_{10}$ | 100K |
| $R_{11}$ | 1M |
| $R_{12}$ | 560K |
| $R_{13}$ | 270K |
| $R_{14}$ | 130K |
| $R_{15}$ | 5.1K |
| $R_{16}$ | 270K |
| $R_{17}$ | 100K |
| $R_{18}$ | 470 |

While the level control circuit described herein has particular utility for a vehicular magnetic tape recorder, it can be used in any situation in which large variations in input signal must be accommodated. Furthermore, while a single specific embodiment has been shown, many variations are possible within the spirit of the invention, which should be considered to be limited only by the following claims.

I claim:

1. An automatic level control circuit having input means for carrying an input signal, output means for carrying an output signal, peak detecting means for detecting input signal peaks above a desired level, low level detecting means for determining an averate input signal below a predetermined level, and digital counting means having a voltage output level responsive to signals from the peak detecting means and low level detecting means.

2. The circuit of claim 1 also comprising a delay switch intermediate the low level detecting means and digital counting means to prevent transmission of a signal from the low level detecting means to the counting means until a preset period of time has elapsed.

3. The circuit of claim 2 also comrpising reset means for restarting the delay switch in the event that the average input signal exceeds the predetermined level subsequent to actuation of the delay switch but prior to lapse of the preset period of time.

4. The circuit of claim 1 also comprising circuit means for increasing or decreasing the output signal level proportionate to the voltage level of the output of the digital counting means.

5. The circuit of claim 4 wherein the circuit means comprises current amplification means to increase the current level from the counting means by a fixed preset multiple.

6. The circuit of claim 4 wherein the circuit means comprises a variable resistor connected in parallel to the output means, said resistor having a resistance substantially inversely proportional to a current dependent on the voltage output of the counting means.

7. The circuit of claim 6 comprising light-emitting means having a light intensity substantially proportional to a current dependent on the voltage output of the counting means, and having a light-sensitive resistor having a resistance level substantially inversely proportional to the intensity of the light-emitting means.

8. An audio magnetic tape recording unit adapted to receive a large variation in input signal level having a circuit for maintaining the input signal level to the unit within predetermined levels, circuit comprising input means for carrying an input signal, output means for carrying an output signal, peak detecting means for detecting input signal peaks above a desired level, low level detecting means for determining an average input signal below a predetermined level, and digital counting means having a voltage output level responsive to signals from the peak detecting means and low level detecting means.

* * * * *